(12) United States Patent
Kerres et al.

(10) Patent No.: US 7,132,496 B2
(45) Date of Patent: Nov. 7, 2006

(54) STEP-BY-STEP ALKYLATION OF POLYMERIC AMINES

(75) Inventors: Jochen Kerres, Ostfildern (DE); W. Zhang, Stuttgart (DE); C. Tang, Hamm (DE)

(73) Assignee: Thomas Haring, Stuttgart (DE)

( * ) Notice: Subject to any disclaimer, the term of this patent is extended or adjusted under 35 U.S.C. 154(b) by 349 days.

(21) Appl. No.: 09/984,488

(22) Filed: Oct. 30, 2001

(65) Prior Publication Data

US 2002/0103306 A1    Aug. 1, 2002

Related U.S. Application Data

(63) Continuation of application No. PCT/EP00/03914, filed on May 2, 2000.

(30) Foreign Application Priority Data

Apr. 30, 1999    (DE)   ............................ P 199 19 708

(51) Int. Cl.
| | |
|---|---|
| *B01D 39/16* | (2006.01) |
| *B01D 71/52* | (2006.01) |
| *B01D 71/68* | (2006.01) |
| *C08G 65/40* | (2006.01) |
| *C08G 75/20* | (2006.01) |

(52) U.S. Cl. ................. 528/172; 210/500.37; 525/534; 525/535; 528/211; 528/373

(58) Field of Classification Search ............... 528/172; 525/535

See application file for complete search history.

(56) References Cited

U.S. PATENT DOCUMENTS

| | | | | |
|---|---|---|---|---|
| 5,643,968 | A | * | 7/1997 | Andreola ..................... 521/27 |
| 6,509,441 | B1 | * | 1/2003 | Kerres ......................... 528/391 |
| 6,767,585 | B1 | * | 7/2004 | Kerres et al. ............... 427/350 |

* cited by examiner

*Primary Examiner*—Robert Sellers
(74) *Attorney, Agent, or Firm*—Edward C. Kwok; MacPherson Kwok Chen & Heid LLP

(57) ABSTRACT

The invention relates to the following: a method for step-by-step alkylation of primary polymeric amines by step-by-step deprotonation with a metallo-organic base and a subsequent reaction with an alkyl halide; a method for modifying tertiary polymeric amines with other functional groups; polymers with secondary/tertiary amino groups and with quaternary ammonium groups; polymers with secondary/tertiary amino groups and other functional groups, especially cation exchanger groupings; membranes consisting of the above polymers, either non-crosslinked or ionically or covalently cross-linked; acid-base-blends/membranes, and a method for producing same, consisting of basic polymers with polymers containing sulphonic acid, phosphonic acid or carboxyl groups; the use of ion exchanger polymers as membranes in membrane processes, e.g., polymer electrolyte membrane fuel cells, direct methanol fuel cells, redox batteries, or electrodialysis; the use of the inventive hydrophilic polymers as membranes in dialysis and reverse osmosis, nanofiltration, diffusion dialysis, gas permeation, pervaporation and perstraction.

6 Claims, 7 Drawing Sheets

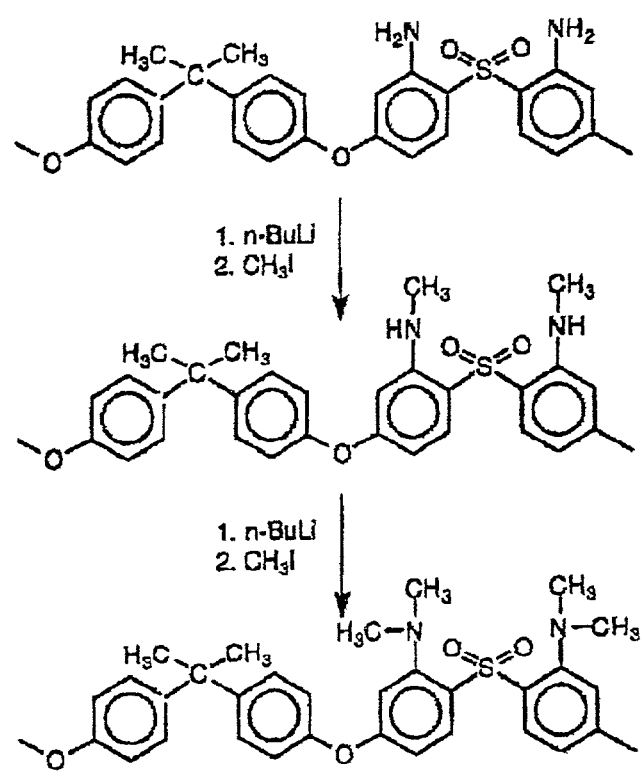
Fig. 1: Alkylation of primary PSU-amine to give the tertiary PSU-amine

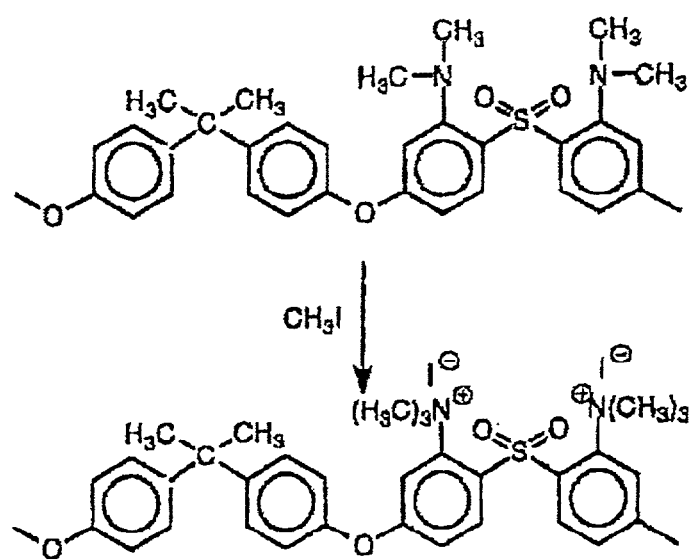
Fig. 2: Quaternization of tertiary PSU-amine to give the quaternary ammonium salt

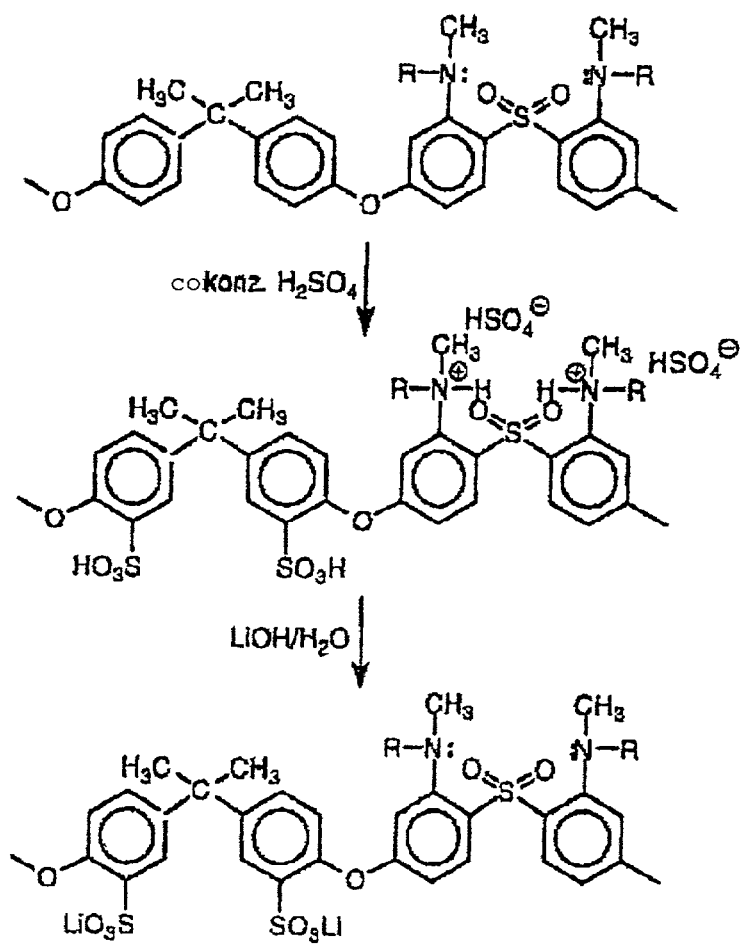
Fig. 3: Electrophilic sulfonation of PSU containing tertiary amino groups with concentrated sulfuric acid (R=H or alkyl, preferably methyl)

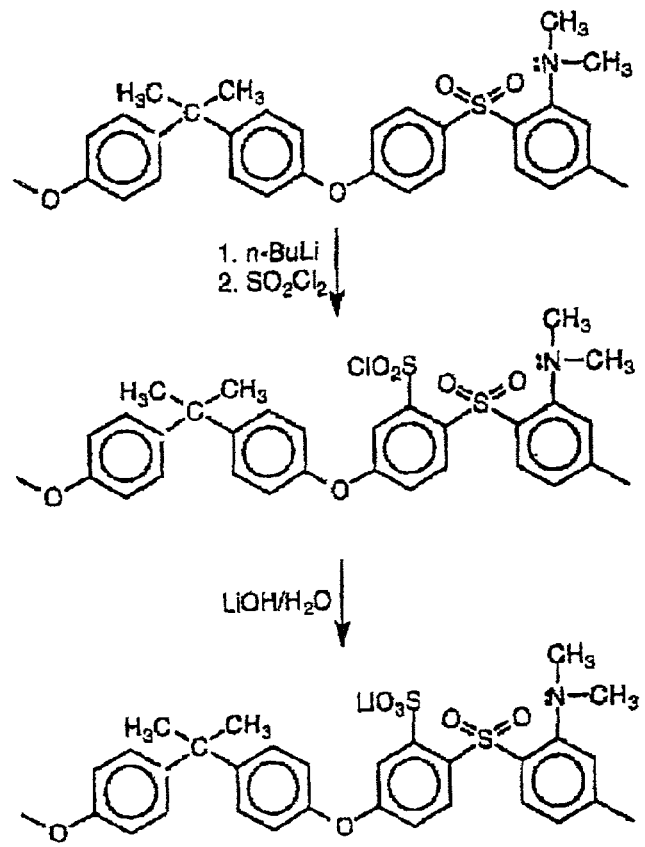
Fig. 4: Lithiation of tertiary PSU amine with subsequent reaction of the lithiated PSU containing tertiary amino groups with $SO_2Cl_2$ to give the PSU-tertiary amine sulfochloride and further by hydrolysis to give the PSU-tertiary amine-sulfonic acid

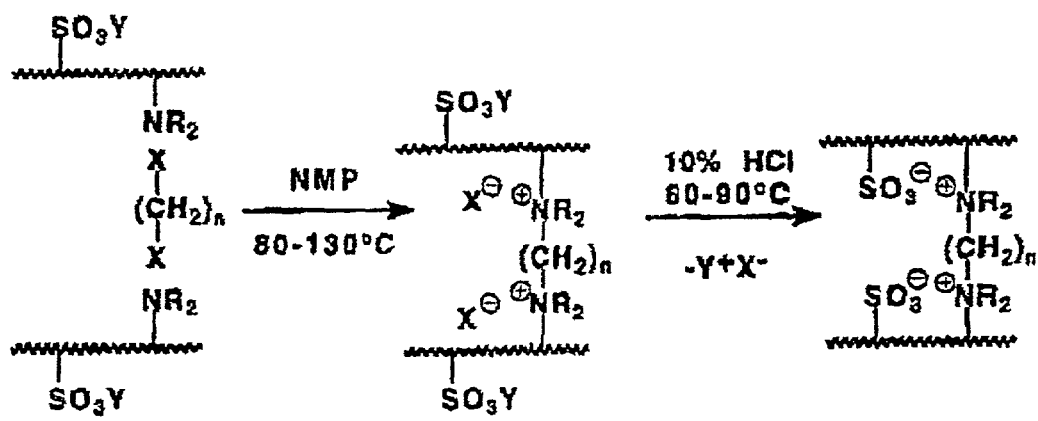
Fig. 5: Covalent crosslinking of acid-base polymers with the formation of a quaternary ammonium salt

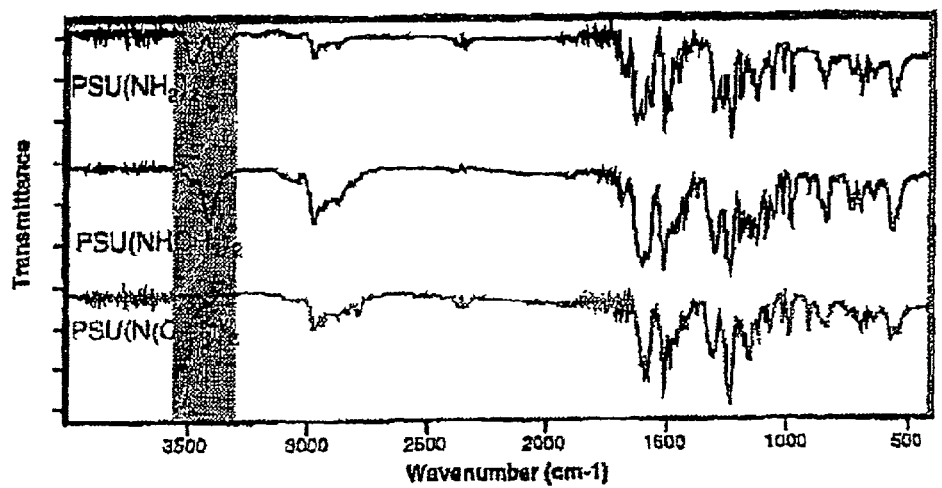
```
View Mode: Stacked
File #2=A122 12.11.98 12:15
Ras=2cm-1
Number of Scans: 18
```
Fig. 6: IR spectra of $PSU(NH_2)_2$, $PSU(NHCH_3)_2$ and $PSU(N(CH_3)_2)_2$

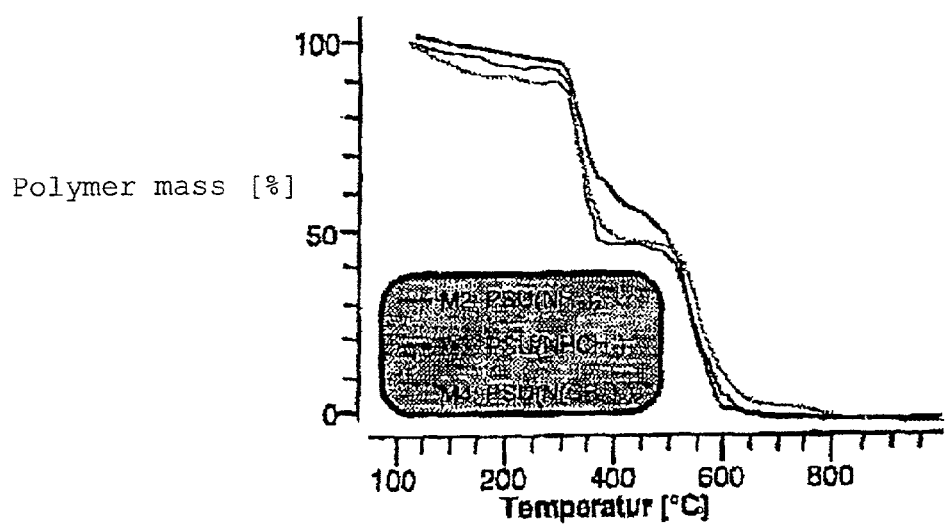
Fig. 7: TGA curves of M2, M3 and M4. Heating conditions: 20°C/min, medium, air

STEP-BY-STEP ALKYLATION OF POLYMERIC AMINES

CROSS-REFERENCE TO RELATED APPLICATIONS

This application is a continuation of the U.S. National Phase of International Application No. PCT/EP00/03914, filed May 2, 2000, now published as WO 00/66254, which claims priority to German Patent Application No. DE 199 19 708.3, filed Apr. 30, 1999, the entire disclosure of each of which is hereby incorporated by express reference hereto.

FIELD OF THE INVENTION

The present invention relates generally to step-by-step alkylation of primary polymeric amines by step-by-step deprotonation with a metallo-organic base and a subsequent reaction with an alkyl halide. The present invention further relates to polymers and membranes made from processes therefor.

BACKGROUND OF THE INVENTION

There are a number of processes for introducing primary amino groups into polymers. Two of these shall be mentioned at this point:
  Reduction of the nitro groups of nitrated polymers with reducing agents suitable for this purpose, for example, with sodium dithionite (Naik, H. A.; Parsons, T. W.: Chemical Modification of Polyarylene Ether/Sulphone Polymers: Preparation and Properties of Materials Aminated on the Main Chain, Polymer 32, 140 (1991)); and
  Introduction of the azide group in lithiated polymers, for example, lithiated polysulfone (Guiver, M. D.; Robertson, G. P.: Chemical Modification of Polysulfones: A Facile Method of Preparing Azide Derivatives From Lithiated Polysulfone Intermediates, Macromolecules 28, 294–301 (1995)) and subsequent reduction of the azide group with sodium borohydride to give the amino group (Guiver, M. D.; Robertson, G. P.; Foley, S.: Chemical Modification of Polysulfones II: An Efficient Method for Introducing Primary Amine Groups onto the Aromatic Chain, Macromolecules 28, 7612–7621 (1995)).

Tertiary amino groups can be introduced into polymers by reacting lithiated polymers with aromatic ketones, aldehydes or carboxylic esters which contain tertiary amino groups (Kerres, J.; Ullrich, A.; H~ring, Th.:Modifikation von Engineeringpolymeren mit N-basischen Gruppen und mit Ionenaustauschergruppen in der Seitenkette [Modification of Engineering Polymers with N-basic Groups and with Ion Exchanger Groups in the Side Chaini, German Patent Application 198 365 14.4 dated Aug. 12, 1998)

From the prior art, no reaction is known with which secondary amino groups can be introduced into a polymer in a targeted manner, nor is a reaction known from the prior art with which it is possible to produce a polymer with secondary amino groups from a polymer with primary amino groups, and to produce a polymer with tertiary amino groups from said polymer with secondary amino groups.

If primary amines are alkylated by means of known processes, tertiary amine and quaternary ammonium salts are also formed in addition to secondary amine. Mixtures of low molecular weight primary, secondary and tertiary amines can be separated from one another, for example, by means of distillation. If, however, the primary amino groups of a polymer are alkylated by means of customary processes, following the reaction, primary, secondary and tertiary amino groups may be present simultaneously on a macromolecule. Thus, using customary alkylating processes, it is not possible to obtain secondary or tertiary polymeric amines from primary polymeric amines in a targeted manner. This technical problem is solved by this invention.

SUMMARY OF THE INVENTION

One aspect of the invention relates to a process for the stepwise alkylation of primary polymeric amines in solution or suspension comprising a) deprotonating a primary amino group on the polymeric amine with an organometallic base to form a carbanion, b) reacting the carbanion with an alkyl halide to provide a secondary amino group, c) deprotonating the secondary amino group with the organometallic base to form another carbanion, and d) reacting the carbanion with an alkyl halide to generate a tertiary amino group.

BRIEF DESCRIPTION OF THE DRAWINGS

FIG. 1 shows the stepwise alkylation of aminated polysulfone (PSU) to give the tertiary amine-PSU.

FIG. 2 shows the quaternization of the tertiary amine-PSU.

FIG. 3 shows the electrophilic sulfonation of PSU containing tertiary amino groups with concentrated sulfuric acid.

FIG. 4 shows the lithiation of tertiary amine-PSU with subsequent reaction of the lithiated PSU containing tertiary amino groups with $SO_2Cl_2$ to provide PSU with tertiary amino groups and $SO_2Ci$ groups.

FIG. 5 shows the covalent crosslinking of sulfonated polymers through the reaction of the tertiary amino groups with a dihaloalkane to form quaternary ammonium groups.

FIG. 6 shows the IR spectra of $PSU(NH_2)_2$, $PSU(NHCH_3)_2$ and $PSU(N(CH_3)_2)_2$.

FIG. 7 shows the thermogravimetry (TGA) curves for $PSU(NH_2)_2$ (M2), $PSU(NHCH_3)_2$ (M3) and $PSU(N(CH_3)_2)_2$ (M4).

DETAILED DESCRIPTION OF THE PREFERRED EMBODIMENTS

The invention relates to:
(1) a process for the stepwise alkylation of primary polymeric amines by stepwise deprotonation with an organometallic base and subsequent reaction with an alkyl halide;
(2) a process for the modification of tertiary polymeric amines prepared by process (1) with further functional groups;
(3) polymers with secondary and/or tertiary amino groups, and with quaternary ammonium groups, obtained by the process (1);
(4) polymers with secondary and/or tertiary amino groups and further functional groups, in particular cation exchanger groups, obtained by the process (2);
(5) membranes of the polymers (1), (2), (3), and/or (4), where the membranes may be uncrosslinked or ionically crosslinked or covalently crosslinked;
(6) a process for the preparation of acid-base blends/acid-base blend membranes of the basic polymers (1), (2), (3), and/or (4), optionally containing further functional groups, with polymers containing sulfonic acid, phosphonic acid or carboxyl groups;

(7) acid-base blends/acid-base blend membranes, obtainable by the process (6), where the blends/blend membranes may additionally also be covalently crosslinked;

(8) the use of ion exchanger polymers (3), (4), (5), and/or (7) as membranes in membrane processes, such as in polymer electrolyte membrane fuel cells (PEFC), direct methanol fuel cells (DMFC), in redox batteries and in electrodialysis; and (9) the use of the hydrophilic polymers (3), (4), (5), and/or (7) as membranes in dialysis and reverse osmosis, nanofiltration, diffusion dialysis, gas permeation, pervaporation, and perstraction.

As a result of this invention, polymers are accessible which contain secondary amino groups and/or tertiary amino groups and/or quaternary ammonium groups which can be obtained stepwise from the polymer modified with primary amino groups. In addition, using this invention, polymers are accessible which, in addition to containing tertiary amino groups which have been obtained by stepwise alkylation of the primary and of the secondary amino groups, also contain further functional groups which, following generation of tertiary amino groups, have been introduced in a further reaction step or in two or more further reaction steps. Furthermore, membranes of the abovementioned polymers and from further polymers which can be admixed are accessible with this invention.

For reasons of clarity, the description of the invention is divided into 3 parts:

a Stepwise alkylation of the primary amino groups of polymers to the secondary and tertiary amino groups and to the quaternary ammonium salt b Introduction of further functional groups into the polymer containing the secondary and/or tertiary amino groups c Acid-base blends of the basic polymers containing the secondary and/or tertiary amino groups with polymers which contain sulfonate, phosphonate or carboxylate groups.

Stepwise Alkylation of the Primary Amino Groups of Polymers to the Secondary and Tertiary Amino Groups and to the Quaternary Ammonium Salt Surprisingly, it has been found that aminated polysulfone PSU, dissolved in tetrahydrofuran (THF), which can be prepared using (Guiver, M. D.; Robertson, G. P.; Foley, S.: Chemical Modification of Polysulfones II: An Efficient Method for Introducing Primary Amine Groups onto the Aromatic Chain, Macromolecules 28, 7612–7621 (1995)), can be selectively deprotonated by n-butyllithium at the amino group to give the salt PSU—$NH^-Li^+$. The addition of an equimolar amount of methyl iodide to the salt PSU—$NH^-Li^+$ gives the secondary polymeric amine PSU—NH—$CH_3$. This secondary polymeric amine can, surprisingly, in turn be deprotonated with n-butyllithium to give the salt PSU—$N(CH_3)Li$. which can be reacted with methyl iodide to give the tertiary PSU amine PSU—$N(CH_3)_2$. If, during the preparation of secondary polymeric amine from the primary polymeric amine, the use of a molar deficit of, for example, n-butyllithium leads to not all $NH_2$-groups being deprotonated to $NH^-Li^+$ (the deprotonation yield of n-butyllithium is virtually 100%), following addition of the methyl iodide, polymers can be obtained which, in addition to the alkylated groups $NHCH_3$, also contain primary amino groups $NH_2$ in the desired $NHCH_3:NH_2$ ratio. If, during the preparation of the tertiary polymeric amine from the secondary polymeric amine, the use of a molar deficit of, for example, n-butyllithium leads to not all $NHCH_3$ groups being deprotonated to $NCH_3^-Li^+$ following addition of the methyl iodide, polymers can be obtained which, in addition to the tertiary group $N(CH_3)_2$, also contain secondary amino groups $NHCH_3$ in the desired $N(CH_3)_2:NHCH_3$ ratio.

The tertiary PSU-amine can be reacted further to give the quaternary ammonium salt by means of customary processes: (Goerdeler, J.: Herstellung von quartern~ren Ammoniumverbindungen [Preparation of quaternary ammonium compounds], Houben-Weyl, Methoden der organischen Chemie [Methods of organic chemistry], Volume XI/2 Stickstoffverbindungen II [Nitrogen compounds II], Georg Thieme Verlag, Stuttgart, p. 591 f. (1958)). FIG. 1 shows the stepwise alkylation of aminated PSU to give the tertiary PSU-amine, and FIG. 2 shows the quaternization of the tertiary PSU-amine.

Introduction of Further Functional Groups into the Polymer Containing the Secondary and/or Tertiary Amino Groups The polymer containing the secondary and/or tertiary amino groups can now be modified with further functional groups. Thus, for example, PSU containing secondary and/or tertiary amino groups can be modified with further functional groups by means of electrophilic substitution reactions. FIG. 3 shows the electrophilic sulfonation of PSU containing tertiary amino groups with concentrated sulfuric acid.

The polymer containing tertiary amino groups can be metalated with organometallic reagents, and the metalated polymer containing tertiary amino groups can be reacted with virtually all electrophilic reagents, as described in Guiver, M. D.: Aromatic Polysulfones Containing Functional Groups by Synthesis and Chemical Modification, Dissertation, Carletown University, Ottawa-Ontario Canada (1987); Guiver, M. D.; Kutowy, O.; Apsimon, J. W.: Aromatische Polysulfonderivate und Verfahren zu ihrer Herstellung [Aromatic polysulfone derivatives and processes for their preparation], DE laid-open 36 36 854 A1 (1987) for only lithiated, nonaminated PSU. FIG. 4 shows the lithiation of tertiary PSU-amine with subsequent reaction of the lithiated PSU containing tertiary amino groups with $SO_2Cl_2$ to give the PSU which, in addition to tertiary amino groups, also contains $SO_2Cl$ groups. The PSU-amine sulfochloride can be hydrolyzed in a further step to the PSU-amine-sulfonic acid.

The reaction of lithiated PSU which contains no tertiary amino groups with $SO_2Cl_2$ to give the PSU sulfochloride and further to give the PSU-sulfonic acid is described in a patent application (Kerres, J.; Schnurnberger, W.: Modifizierte Polymere und Polymermembrane [Modified Polymers and Polymer Membranes], German patent application 198 09 119.2 dated Mar. 4, 1998).

Polymers according to the invention which, in addition to the tertiary amino group, also have other, preferably acidic, groups (examples: $SO_3Y$, $PO_3Y_2$—, COOY groups, Y=H, monovalent metal cation)) may additionally also be covalently crosslinked according to the following process: the polymer containing the tertiary amino group and the preferably acidic groups is dissolved in the salt form (Y=Li, Na, K) in a dipolar-aprotic solvent (for example dimethyl sulfoxide DMSO, sulfolane, N,N-dimethylformamide DMF, N,N-dimethyl acetamide DMAc, N-methylpyrrolidineone NMP). A dihaloalkane X—$(CH_2)_n$—x where X=Br or I and n=3–12 is added to the polymer solution in a concentration of from 0.1 mol per mole of tertiary amino group to 0.5 mol per mole of tertiary amino group. During evaporation of the solvent at elevated temperature, the dihaloalkane reacts with the tertiary amino groups with the simultaneous formation of quaternary ammonium groups and covalent crosslinking sites (FIG. 5).

If the acid-base polymer/acid-base polymer membrane is converted to the acid form by after-treatment in dilute mineral acid, i.e., the X⁻ "microions" are replaced by "macroions" of the acidic groups of the polymer, then intra- and inter-molecular ionic crosslinking of the acid-base polymer is obtained, in addition to the covalent crosslinking of the polymer, significantly increasing the mechanical and thermal stability of the polymer.

The Acid-base Blends of the Basic Polymers Containing the Secondary and/or Tertiary Amino Groups with Polymers which Contain Sulfonate, Phosphonate or Carboxylate Groups The secondary and tertiary polymer amines according to the invention can then be combined with acidic polymers, which may contain $SO_3Y$, $PO_3Y_2$ or COOY groups (Y=H, monovalent metal cation or $NR_3H^+$ (R=H, alkyl, aryl)) to give acid-base blends and acid-base blend membranes, for example in accordance with Kerres, J., Cui, W.: S~ure-Base-Polymerblends und ihre Verwendung in Membranprozessen [Acid-base polymer blends and their use in membrane processes], German patent application 198 17 376.8 dated Apr. 18, 1998. In this connection, the resulting acid-base blends and blend membranes can also additionally be covalently crosslinked by means of the following method: an amine according to the invention or any desired polymeric tertiary amine (which may also be a polymer with the pyridine radical) is dissolved in a dipolar-aprotic solvent (for example, dimethyl sulfoxide DMSO, sulfolane, N,N-dimethylformamide DMF, N,N-dimethylacetamide DMAc, or N-methylpyrrolidineone NMP) together with a polymer which can contain $SO_3Y$, $PO_3Y_2$ or COOY groups (Y=H, monovalent metal cation or $NR_3H^+$ (R=H, alkyl, aryl)). A dihaloalkane X—$(CH_2)_n$—X where X=Br or I and n=3–12 is added to the polymer solution in a concentration of from 0.1 mol per mole of tertiary amino group to 0.5 mol per mole of tertiary amino group. During evaporation of the solvent at elevated temperature, the dihaloalkane reacts with the tertiary amino groups with the simultaneous formation of quaternary ammonium groups and covalent crosslinking sites ($P_1$=polymer radical of the basic polymer containing tertiary basic nitrogen):

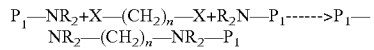

This means that the basic component of the acid-base blend/acid-base blend membrane covalently crosslinks with itself and is ionically crosslinked with the acidic component if the acid-base blend/acid-base blend membrane is converted to the acid form, i.e. the X⁻ "microions" in the above reaction equation are replaced by "macroions" of the acidic component (below: —$SO_3^-$ macroions) of the acid-base blend:

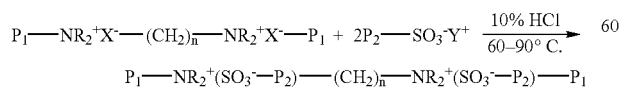

The above ionic and also covalent crosslinking of these blends/blend membranes leads to very good mechanical and thermal stabilities.

Examples of aryl main chain polymers which can be used according to the invention are some important engineering thermoplastics such as:
poly(ethersulfone) PSU Udel® ($[R_1$—$R_5$—$R_2$—$R_6$—$R_2$—$R_5]_n$; $R_2$: x=1, $R_4$=H),
poly(ethersulfone) PES VICTREX® ($[R_2$—$R_6$—$R_2$—$R_5]_n$; $R_2$: x=1, $R_4$=H)
poly(phenylsulfone) RADEL R® ($[(R_2)_2$—$R_5$—$R_2$—$R_6$—$R_2]_n$; $R_2$: x=2, $R_4$=H)
polyetherethersulfone RADEL A® ($[R_5$—$R_2$—$R_5$—$R_2$—$R_6]_n$—$[R_5R_2R_6R_2]_m$; $R_2$: x=1, $R_4$=H, n/m=0.18),
poly(phenylene sulfide) PPS ($[R_2$–$R_8]_n$; $R_2$: x=1, $R_4$=H)
poly(phenylene oxide) PPO ($[R_2$–$R_5]_n$; $R_4$=$CH_3$)

The abovementioned novel secondary and tertiary polymer amines and the process for the preparation thereof have hitherto not been described in the literature. Neither have any polymers which, in addition to the secondary and tertiary amino groups according to the invention, also contain further functional groups, in particular cation exchanger groups, become known. Neither have any acid-base blend membranes of the secondary and/or tertiary polymer amines according to the invention and from polymers containing cation exchanger groups ($SO_3Y$, $PO_3Y_2^-$ or COOY groups, Y=H, monovalent metal cation or $NR_3H^+$ (R=H, alkyl, aryl)) become known. Likewise, no simultaneously ionically and covalently crosslinked acid-base polymers and acid-base polymer blends have become known from the literature.

The advantages of the invention are:
Secondary and/or tertiary polymeric amines can be produced in a targeted manner from primary polymeric amines. The yields of the reaction are good, and in the case of mixed polymeric amines according to the invention, the ratio between primary and secondary and between secondary and tertiary amino groups can be adjusted in a targeted manner.
From the resulting tertiary polymeric amines it is possible, in a targeted manner, to prepare quaternary ammonium salts which are uncrosslinked or crosslinked to the desired degree (anion exchanger polymers and membranes)
Further functional groups can be introduced in a targeted manner into the secondary and/or tertiary polymeric amines according to the invention by means of an electrophilic reaction.
Further functional groups can be introduced in a targeted manner into the tertiary polymeric amines according to the invention by means of metalation and subsequent reaction with a desired electrophilic agent.
The polymeric amines according to the invention can be reacted with polymers containing cation exchanger groups as desired to give acid-base blends.
The acid-base polymers and acid-base polymer blends according to the invention can be simultaneously covalently and ionically cros 5 linked.

EXAMPLES

Examples 1–2

Reaction of Diaminated $PSU(NH_2)_2$ with n-butyllithium and Subsequently with Methyl Iodide to Give the Secondary PSU-amine $PSU(NHCH_3)_2$ Mixture:
9.44 g of diaminated PSU (0.02 mol)
500 ml of anhydrous THF 4 ml of 10 M n-BuLi (0.04 mol)
7.6 ml of iodomethane (0.12 mol)
37 ml (0.5 mol) of triethylamine Experimental Set-up:
1 L glass reaction flask, mechanical stirrer, condenser, argon inlet, mercury bubbler valve Experimental Procedure:

The diaminated PSU is dissolved in THF under argon. It is then cooled to −70° C. The solution is titrated with 2.5 M n-BuLi until the deep red color of the PSU—NH⁻Li⁺ ion arises. The 10 M n-BuLi solution is then injected into the polymer solution. The solution is stirred for 30 minutes. The methyl iodide is then injected into the solution. The solution decolorizes. The solution is allowed to warm to room temperature, and the triethylamine is injected in in order to destroy excess methyl iodide. The mixture is heated to 40° C. and stirred for 1 hour. The reaction solution is then precipitated in 2l of isopropanol. The mixture is stirred for 1 hour and the polymer precipitate is filtered off. The filter residue is slurried in 1 l of isopropanol and stirred for 1 day (24 hours). The mixture is then filtered again, and the filter residue is stored for 1 day at 70° C. in a drying cabinet in 1 L of water in order to wash amine residues out of the polymer. The mixture is filtered again and washed with water until the washing solution shows a neutral reaction. The polymer is dried to a constant weight at 7000 in a vacuum drying cabinet.

Characterization Results of the Reaction Products from Examples 1–2

Elemental Analysis:

Table 1 gives the results of the elemental analysis of $PSU(NH_2)_2$, $PSU(NHCH_3)_2$ and $PSU(N(CH_3)_2)_2$. Agreement between the calculated and experimental elemental analysis data is good.

TABLE 1

| Aminated PSU | | % C | % H | % N | % S |
|---|---|---|---|---|---|
| $PSU(NH_2)_2$ | Calculated found | 68.6 | 5.1 | 5.9 | 6.8 |
| | | 66.8 | 5.3 | 6.4 | 6.5 |
| $PSU(NHCH_3)_2$ | Calculated found | 69.6 | 5.6 | 5.6 | 6.4 |
| | | 68.3 | 5.9 | 6.1 | 5.9 |
| $PSU(N(CH_3)_2)_2$ | Calculated found | 70.4 | 6.1 | 5.3 | 6.1 |
| | | 68.4 | 5.8 | 5.9 | 5.2 |

FTIR

The IR spectra of $PSU(NH_2)_2$, $PSU(NHCH_3)_2$ and $PSU(N(CH_3)_2)_2$ are shown in FIG. 6. They have significant differences. The differences are particularly evident in the wavenumber range 3300 to approximately 3550 cm¹, the region of N—H stretching vibrations. Thus, in the case of the primary PStJ-amine, adjacent symmetrical and asymmetrical N—H stretching vibrations arise, while in the case of the secondary PSU-amine only one N—H stretching vibration is of course present, which in the case of the tertiary PSU-amine should have disappeared completely. In the tertiary PSU-amine spectrum, a N—H stretching vibration is present which is markedly attenuated relative to the IR spectrum of the secondary PSU-amine. This indicates that only a small proportion of secondary amino groups is still present in the tertiary PSU-amine.

Example 3

Acid-base Blend Membrane of the Reaction Products from 6.1 and 6.2 with Sulfonated PStJ in the $SO_3Li$ Form 4.5 g of sulfonated PSU Udel® in the $SO_3Li$ form (IEC=1.6 meq of $SO_3Li$/g of polymer) are dissolved in 25 g of N-methylpyrrolidineone. 0.5 g of the reaction product from the reactions 6.1/6.2 (2 groups per PSU repeat unit) is then added to the solution and stirred until dissolved. The [lacuna] is then filtered, degassed and applied in a thin film to a glass plate. The solvent is then evaporated at 12000. The glass plate is then placed into a bath with demineralized water, and the polymer membrane formed detaches from the glass plate. The membrane is then after-treated at 7000 firstly in 10% strength sulfuric acid and then in demineralized water. The membrane is then characterized (see below).

Characterization Results:

Table 2 shows the characterization results of prepared $PSU—NR_2/PSU—SO_3H$ membranes.

TABLE 2

| Membrane [No.] | Type of $PSU-NR_2$ | Content of $PSU-SO_3Li$ [% by wt.] | $IEC_{measured}$ [nmeq of $SO_3H$/g] | Swelling [%] | $R_{sp}H+$ [Ω*cm] |
|---|---|---|---|---|---|
| M2 | Comparison: $PSU(NH_2)_2$ | 90 | 1.432 | 22.2 | 32.4 |
| M3 | $PSU\ NH(CH_3)_2$ | 90 | 1.235 | 19.5 | 23.4 |
| M4 | $PSU\ (N(CH_3)_2)_2$ | 90 | 1.255 | 23.9 | 29.5 |

*measured in 0.5 N $H_2SO_4$

FIG. 7 shows the thermogravimetry (TGA) curves of the three membranes listed in Table 2.

Example 4

Ionically Crosslinked Acid-Base Blend Membrane of the Reaction Product 6.2 and from Sulfonated Polysulfone in the $SO_3H$ Form 2.7 g of sulfonated PSU Udel® in the $SO_3H$ form (IEC=1.67 meq of $SO_3H$/g of polymer) are dissolved in 15 ml of n-methylpyrrolidineone (NMP). 0.63 ml of triethylamine is then added to the solution in order to neutralize the sulfonic acid groups of the sulfonated PSU. 0.3 g of the reaction product from the reaction 6.2 ($PSU(N(CH_3)j_2$ is then added to the solution. The mixture is stirred until the reaction product has dissolved. A film is then drawn from the polymer solution on a glass plate, and then the solvent is evaporated at temperatures of 70–90–120° C. in a drying cabinet at a pressure below atmospheric pressure of, ultimately, 50 mbar. After the solvent has evaporated, the glass plate with the polymer film is left to cool and then placed into a waterbath so that the polymer film detaches from the glass plate. The membrane is then after-treated for 24 h at 70–80° C. in 10% strength sulfuric acid and then for 24 h at 60° C. in water. The proton resistance of the membrane is then measured.

Characterization Result: $R_{sp}H^+$=83 Ω*cm

Example 5

Covalently and Ionically Crosslinked Acid-Base Blend Membrane of the Reaction Product of Example 2 & Sulfonated Polysulfone in the SO$_3$H form 2.7 g of sulfonated PSU Udel® in the SO$_3$H form (IEC=1.67 meq of SO$_3$H/g of polymer) are dissolved in 15 ml of N-methylpyrrolidineone (NMP). 0.63 ml of triethylamine is then added to the solution in order to neutralize the sulfonic acid groups of the sulfonated PSU. 0.3 g of the reaction product from the reaction in Example 2 (PSU(N(CH$_3$)$_2$)$_2$) is then added to the solution. The mixture is stirred until the reaction product has dissolved. 37.4 pl of diiodobutane are then injected in. The mixture is stirred for half an hour. A film is then drawn from the polymer solution on a glass plate, and then the solvent is evaporated at temperatures of 70–90–120° C. in a drying cabinet at a pressure below atmospheric pressure of, ultimately, 50 mbar. After the solvent has evaporated, the glass plate with the polymer film is left to cool and then placed into a waterbath so that the polymer film detaches from the glass plate. The membrane is then after-treated for 24 h at 70–80 C in 10% strength sulfuric acid and then for 24 h at 60° C. in water. The proton resistance of the membrane is then measured.

Characterization Result: $R_{sp}H^+$=83 Ω*cm

What is claimed is:

1. A polymer comprising tertiary amino groups, sulfinate groups, and at least one group selected from the group consisting of sulfonate groups (—SO$_3$Y), phosphonate groups (—PO$_3$Y$_2$), and carboxylic groups (—COOY), wherein Y represents a hydrogen atom or a monovalent metal cation.

2. A polymer according to claim 1 comprising an aryl main chain polymer.

3. A polymer according to claim 2, wherein the aryl main chain polymer comprises at least one of the following R$_{aromatic}$ and at least one R$_{bridge}$ from the following building blocks:

| R$_{aromatic}$ | R$_{bridge}$ |
|---|---|

R$_1$: [two phenyl rings connected by C with R$_3$, R$_3$]

R$_2$: [phenyl ring with R$_4$, R$_4$]$_x$

R$_5$: —O—

R$_6$: —S(=O)(=O)—

R$_7$: —C(=O)—

R$_8$: —S— wherein R$_3$ and R$_4$ each individually comprise a hydrogen, methyl, phenyl, naphthyl, pyridyl, or trifluoromethyl group, or a group having the formula C$_n$H$_{2n+1}$ where n is from 1 to 20.

4. Polymer comprising tertiary amino groups, sulfinate groups and at least one group selected from the group consisting of sulfonate groups (—SO$_3$Y), phosphonate groups (—PO$_3$Y$_2$) and carboxylic groups (—COOY) wherein Y represents a hydrogen atom or a monovalent metal cation, wherein the number of tertiary amino groups in the polymer is between 0.1 and 4 per polymer repeat units.

5. A pervaporation, perstraction, gas separation, dialysis, ultrafiltration, nanofiltration, or reverse osmosis thin film, membrane or hollow fiber comprising the polymer according to claim 1.

6. A proton-conducting fuel cell electrolyte membrane, electrolysis membrane, aqueous or non-aqueous electrodialysis membrane, or diffusion dialysis membrane comprising the polymer according to claim 1.

* * * * *